(12) United States Patent
Suito

(10) Patent No.: US 8,503,772 B2
(45) Date of Patent: Aug. 6, 2013

(54) IMAGE PROCESSING UNIT, IMAGE PROCESSING METHOD, AND DEVICE FOR ADJUSTING TONE OF MONOTONE IMAGES BY REDUCING COLOR AS A FUNCTION OF BRIGHTNESS

(75) Inventor: Hiroshi Suito, Yokohama (JP)

(73) Assignee: Ricoh Company, Ltd., Tokyo (JP)

( * ) Notice: Subject to any disclaimer, the term of this patent is extended or adjusted under 35 U.S.C. 154(b) by 253 days.

(21) Appl. No.: 12/783,136

(22) Filed: May 19, 2010

(65) Prior Publication Data

US 2010/0303346 A1 Dec. 2, 2010

(30) Foreign Application Priority Data

May 29, 2009 (JP) .................................. 2009-130072

(51) Int. Cl.
*G06K 9/00* (2006.01)
(52) U.S. Cl.
USPC .......................................................... 382/163
(58) Field of Classification Search
None
See application file for complete search history.

(56) References Cited

U.S. PATENT DOCUMENTS

| | | | |
|---|---|---|---|
| 7,113,207 B2 * | 9/2006 | Fukui et al. | 348/225.1 |
| 2005/0068587 A1 * | 3/2005 | Hayaishi | 358/3.01 |

FOREIGN PATENT DOCUMENTS

| | | |
|---|---|---|
| JP | 2004-336386 A | 11/2004 |
| JP | 2006-238024 A | 9/2006 |
| JP | 2007-166543 A | 6/2007 |
| JP | 2008-160475 A | 7/2008 |
| JP | 2008-67296 A | 10/2009 |

* cited by examiner

*Primary Examiner* — Barry Drennan
*Assistant Examiner* — Andrew Moyer
(74) *Attorney, Agent, or Firm* — Dickstein Shapiro LLP

(57) ABSTRACT

An image processing unit is configured to include a monotone image generator which generates a monotone image from a color image and a color reducer which reduces a color of an image by reducing chroma of the image in accordance with brightness of the image. The color reducer adjusts a tone of the monotone image generated by the monotone image generator by reducing a color of a high brightness portion of the image at a higher level than a low brightness portion of the image.

9 Claims, 5 Drawing Sheets

IMAGE PROCESSING UNIT, IMAGE PROCESSING METHOD, AND DEVICE FOR ADJUSTING TONE OF MONOTONE IMAGES BY REDUCING COLOR AS A FUNCTION OF BRIGHTNESS

CROSS REFERENCE TO RELATED APPLICATION

The present application is based on and claims priority from Japanese Patent Application No. 2009-130072, filed on May 29, 2009, the disclosure of which is hereby incorporated by reference in its entirety.

BACKGROUND OF THE INVENTION

1. Field of the Invention

The present invention relates to an image processing unit for use in an imaging device such as a digital camera recording image data in monotone mode which performs image correction on digital color image data, an image processing method for digital color image data in an imaging device, and an imaging device incorporating such an image processing unit.

2. Description of the Related Art

Some imaging devices such as a digital camera include a monotone photographing function to generate monotone images. In general, such an imaging device comprises an image sensor as a CCD with a color filter so that color images are generated. In order to generate a monotone image, the imaging device needs to perform monotonizing processing to color images. By way of example, image monotonizing is done by converting RGB data into YUV data and then setting UV data representing a color difference to zero to remove the color of an image. Also, sepia-toned images can be created by setting UV data for all pixels to the same value.

Black tone is one of the key factors to determine the impression of a monotone image. In silver halide photography, black tone representation will differ depending on property of a film developer and photographic paper and there are a neutral pure black tone, a warm black tone with softness added, a cold black tone with sharpness added, and the like.

Needless to say that black tone representation is very important in the monotone photographing with the digital camera. It has been required for the digital camera to realize the same black tone representation as that of the silver halide photography.

In order to meet such a demand, Japanese Laid-open Patent Publication No. 2008-67296 (Reference 1) and No. 2007-166543 (Reference 2) disclose a technique to adjust the black tone (pure black tone, warm black tone, cold black tone) of monotone images according to users' tastes.

Moreover, Japanese Laid-open Patent Publication No. 2004-336386 (Reference 3) discloses a technique to perform three kinds of image processing on full color images to adjust all of brightness, chroma, and hue thereof but perform only a single image processing on monotone (sepia-toned or monochrome) images to adjust brightness thereof.

However, there is a problem that the digital camera with a color filter cannot generate monotone images in the same black tone representation, warm or cold, as the silver-halide camera does, even using the above techniques. Further, realizing warm or cold black tone representation in an image with a digital camera requires a lot of skills and knowledge about photography.

SUMMARY OF THE INVENTION

The present invention aims to provide an image processing unit and an image processing method which can generate monotone images with a higher quality by reducing chroma of the images in accordance with brightness thereof as well as to provide an imaging device incorporating such an image processing unit.

According to one aspect of the present invention, an image processing unit comprises a monotone image generator which generates a monotone image from a color image, a color reducer which reduces a color of an image by reducing chroma of the image in accordance with brightness of the image, wherein the color reducer adjusts a tone of the monotone image generated by the monotone image generator by reducing a color of a high brightness portion of the image at a higher level than a low brightness portion of the image.

According to another aspect of the invention, an image processing method comprises the steps of generating a monotone image from a color image and reducing a color of an image by reducing chroma of the image in accordance with brightness of the image, wherein in the color reducing step, a tone of the monotone image generated in the monotone generating step is adjusted by reducing a color of a high brightness portion of the image at a higher level than a low brightness portion of the image.

BRIEF DESCRIPTION OF THE DRAWINGS

Features, embodiments, and advantages of the present invention will become apparent from a detailed description with reference to the following drawings.

DETAILED DESCRIPTION OF THE PREFERRED EMBODIMENT

As described above, monotone images are generated with a digital camera by removing color from color images once (monochromization) and then adding color thereto when necessary. To represent a warm or cold black tone in a monotone image using a digital camera, it is necessary to add colors to color-removed images. However, thus-generated warm or cold black tone images have a uniform tone as a whole which is different from warm or cold black tones of the silver-halide photography.

The inventor of the present invention studied the causes of this problem and found out that in the image processing of the digital camera a monotone image is generated by evenly adding an offset value to UV data (color difference) of a color-removed YUV image, which results in adding color even to a high brightness portion of the image. To the contrary, a high brightness portion (in white or near white) of an image captured by the silver-halide camera has no color and reflects color of photographic paper. This causes a difference in black tone images captured by the silver-halide camera and the digital camera.

Furthermore, referring back to the References 1, 2, both of them do not disclose adjusting the tone of an image by adjusting chroma thereof for each brightness. The Reference 3 does not disclose adjusting chroma of a monochrome image either so that color is added evenly to the YUV image irrespective of brightness of the image. The present invention has been made in order to solve such a problem that with the digital camera, a warm black tone image and a cold black tone image cannot be generated as those with the silver-halide camera.

Hereinafter, an image processing unit and method according to one embodiment of the present invention will be described in detail with reference to the accompanying drawings. The present embodiment exemplifies an image processing unit used for an imaging system of a digital camera; however, the present invention is not limited thereto. It is applicable to a device incorporating an image input unit and a display unit.

Figure 1A:
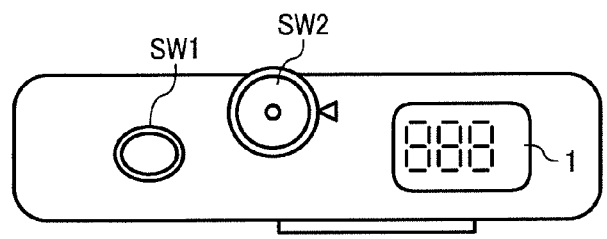
FIG. 1A to FIG. 1C is a top view, a front view, and a back view of a digital still camera, respectively as an imaging device incorporating an image processing unit according to one embodiment of the present invention.
Figure 1B:
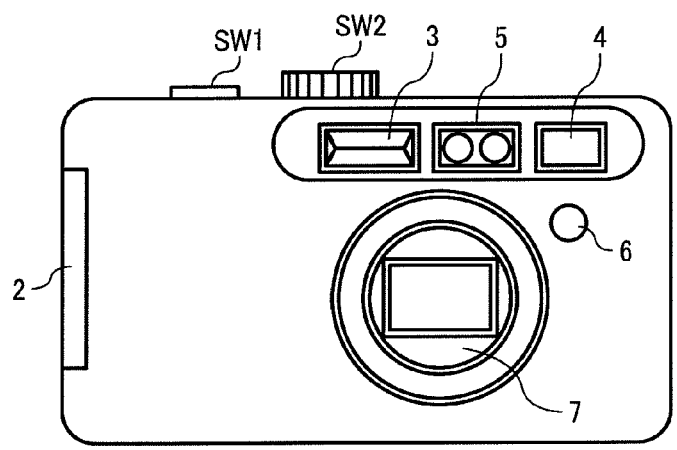
Figure 1C:
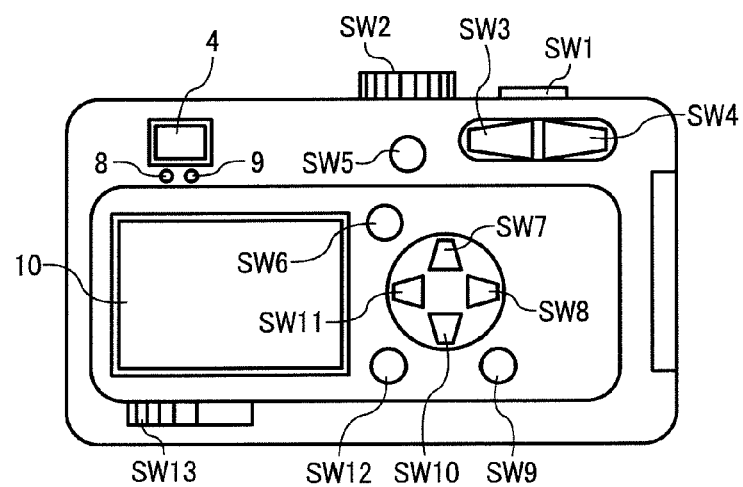

FIG. 1A to FIG. 1C show an example of a digital still camera (hereinafter, camera) as an image processing unit of an imaging device according to one embodiment of the present invention.

A shutter button SW1, a mode dial SW2, and a sub LCD (liquid crystal display) are provided on the top face of a camera body as in FIG. 1A.

On the front face (subject side) in FIG. 1B provided are a lens barrel unit 7 including a photographic lens, an optical finder 4, a stroboscopic portion 3, a ranging unit 5, and a remote control light receiving portion 6. A SD card/battery box cover 2 is provided on the left side of the camera body.

On the back face (photographer side) in FIG. 1C provided are a power-on switch SW13, an LCD 10, an auto focus LED 8, a stroboscopic LED 9, an optical finder 4, a wide zoom switch SW3, a telephoto zoom switch SW4, a self timer switch SW5, a menu switch SW6, an upward movement/strobe switch 7, a rightward movement switch SW8, a display switch SW9, a downward movement/macro switch SW10, a leftward movement/image check switch SW11, and an OK switch 12.

Next, the internal system of the camera will be described with reference to FIG. 2. The lens barrel unit 7 includes a zoom lens capturing an optical image of a subject, a zoom system 7a including a zoom lens drive motor, a focus system including a focus lens and a focus lens drive motor, and a mechanical shutter unit 7c including an aperture diaphragm, a diaphragm motor, a mechanical shutter, and a mechanical shutter motor. The motors are driven by a motor driver 108 which is controlled by a CPU 105c.

A CCD 101 is a solid image sensor to photo-electrically convert optical images and converts light incident through the lenses of the lens barrel unit 7 into an electric signal (data) for outputs. An F/E (front end)-IC 104 receives the electric signal from the CCD 101 and comprises a CDS (correlated double sampling) 104a sampling and holding the electric signal (analog image data) from the CCD 101 to remove noise from an image, an auto gain control (AGC) 104b adjusting a gain of the sampled data, an A/D converter 104c converting the electric signal to a digital signal, and a timing generator (TG) 104d controlled by a CPU 105c to generate drive timing signals for the CCD 101, CDS 104a, AGC 104b, and A/D converter 104c according to a vertical synchronous signal (VD) and a horizontal synchronous signal (HD) from a CCD interface (I/F) 105a.

A signal processing IC 105 corresponds to the image processing unit of the present invention and receives digital video signals from the F/E-IC 104. It comprises the CCD I/F 105a outputting VD and HD synchronous signals to the CCD 101 and capturing data in line with the synchronous signals, a memory controller 105b, the CPU 105c controlling the entire system and extracting color information, a YUV converter 105d converting digital image signals into data in YUV format displayable and recordable, a data compressor/decompressor 105e for data recording in JPEG format, a display output controller 105f controlling display outputs, a re-sizing unit 105g changing the size of an image for display or recording, and a media interface (I/F) 105h controlling image data write to a memory card.

Further, the CPU 105c is connected with a manipulation unit 107 for user inputs and an ROM 109 and various data can be input to the CPU 105c. The ROM 109 stores control programs to control the camera and the CPU 105c operates according to the programs and input data. Upon turn-on of the power-on switch SW13 of the camera, the control programs in the ROM 109 is loaded into a main memory of the CPU 105c which controls the operations of the respective elements according to the control programs and temporarily stores control data, parameters and else in an SDRAM 106.

The display output controller 105f outputs a video signal having a synchronous signal or the like added to the LCD 10.

The SDRAM 106 is connected to the memory controller 105b via a bus line, and temporarily stores image data and JPEG compressed data, stores display data and also functions as a RAM of the CPU 105c. Various data as RAW-RGB image data (after white balance, γ setting) from the signal processing IC 105, YUV image data (after brightness data, color difference data conversion), JPEG image data (compressed in JPEG format) are stored in the SDRAM 106.

Next, general operation of the digital still camera is described. When a user sets a shooting mode with the mode dial switch SW2 for switching shooting and reproducing and presses down the power-on switch SW13, the camera starts up in a recording mode. The mode dial switch SW2 and power-on SW13 are included in the manipulation unit in FIG. 2. The CPU 105c detects the shooting mode set in the dial switch SW2 and the power-on of the switch SW 13 and controls the motor driver 108 to move the lens barrel unit 7 to a ready position for shooting a subject. Also, it activates the CCD 101, F/E-IC 104, LCD 10, and the like.

Upon the activation of the respective elements, an operation starts in the finder mode in which light incident through the lenses of the lens barrel unit 7 is converted into electric signals (analog signals). The F/E-IC 104 receives the electric signals and converts them to digital data in 12 bits. The digital data is captured in the YUV converter 10d of the CCD I/F 105a and converted into displayable YUV signals. Then, the YUV signals are written into the SDRAM (frame memory) 106 and read therefrom by the memory controller 105b to the LCD 10 via the display output controller 105f for display. All the processing above are done with 1/30 second interval and image display is updated in every 1/30 second in the finder mode.

The CCD I/F 105a of the signal processing IC 105 calculates, based on digital RGB signals, an autofocus (AF) evaluation value indicating a focus level of an image, an auto exposure (AE) evaluation value relating to brightness of a subject, and an auto white balance (AWB) value relating to a color of a subject. These values are read as characteristic data by the CPU 105c and used for the autofocus, auto exposure, and auto white balance operations.

The AF evaluation value is calculated based on an integration value of an output of a high frequency component filter or an integration value of a difference in brightness of neighboring pixels, for example. With a subject in focus, the amounts of high frequency components are largest in an image since the edge portion of the subject is sharp and clear. Using this phenomenon, the CPU 105c performs autofocus. That is, the CPU 105c acquires an AF evaluation value in each focus lens position and determines a lens position with the maximal AF evaluation value to be an in-focus position.

The AE evaluation value and AWB evaluation value are calculated from RGB integration values. For example, the CPU 105c equally divides an image into 256 blocks (horizontal 16×vertical 16) to calculate RGB integration values of each block. Then, it reads the integration values and calculates brightness for each block to determine appropriate exposure time based on brightness distribution in auto exposure. In auto white balance it determines a control value for auto white balance in accordance with the color of light from a distribution of the RGB integration values. The AE and AWB operations are continuously performed during the finder mode.

Upon the shutter button SW1 being pressed, the AF operation and still image recording are started and a still image shooting start signal is transmitted from the manipulation unit 107 to the CPU 105c. The CPU 105c controls the motor driver 108 to move the focus lens of the lens barrel unit 7 to an in-focus position in synchronization with a frame rate.

After completion of the autofocus, an output signal from the CCD 101 is transmitted to the signal processing IC 105 via the F/E-IC 104, converted into a digital RGB signal and then stored in the SDRAM 106. The digital RGB signal is captured in the signal processing IC 105, converted into YUV data and written back to the SDRAM 106.

During a still image shooting, the YUV image data is transmitted to the compressor/decompressor 105e of the signal processing IC 105, compressed thereby, and written back to the SDRAM 106. The compressed data is read from the SDRAM 106 via the signal processing IC 105 and stored in a memory such as a memory card.

Figure 2:
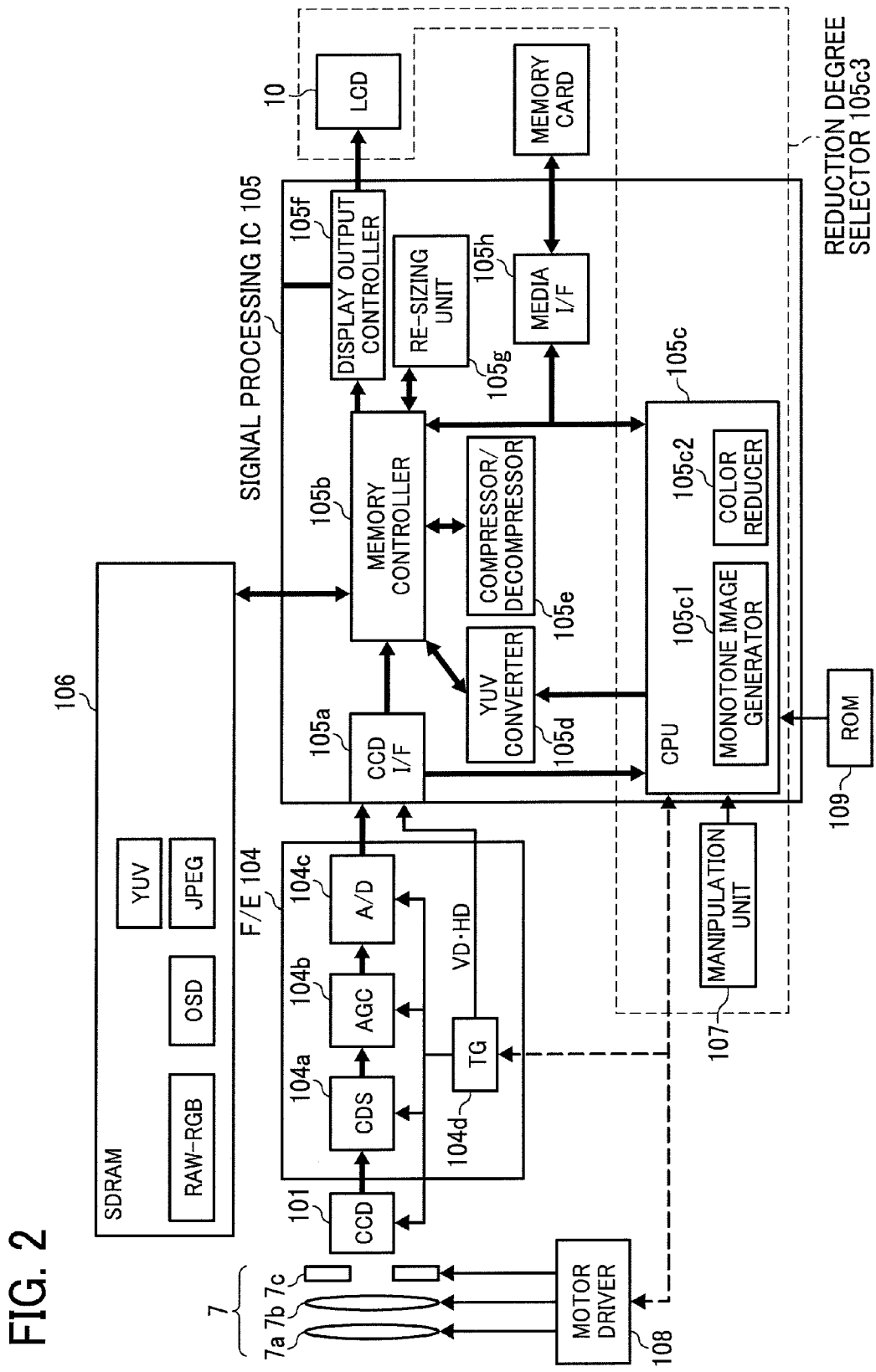
FIG. 2 schematically shows the imaging system of the digital still camera in FIG. 1.
Figure 3:
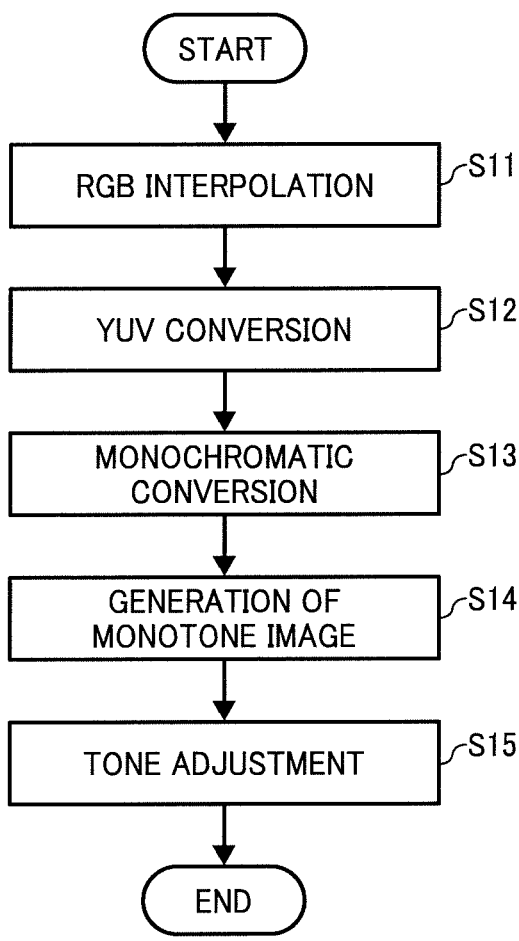
FIG. 3 is a flowchart for image processing of the image processing unit according to the one embodiment.

Next, an imaging processing for capturing a monotone image with the digital still camera in FIGS. 1, 2 is described with reference to a flowchart in FIG. 3.

In step S11 RGB interpolation is carried out. An optical image captured with the CCD 101 via the lens system of the lens barrel unit 7 is converted into a digital video signal in the F/E-IC 104 and inputted to the signal processing IC 105. Prior to the YUV conversion in the YUV converter 105d, RAW data is subjected to various image processing such as defective pixel correction, black level adjustment, and shading correction, and then to gradation correction. In the present embodiment RAW data is a 12-bit signal and through the gradation correction the data is converted into a 8-bit signal. The gradation correction of an image is performed referring to a preset lookup table. First, 12-bit (4096) RAW data is allocated to 8-bit (256) signals, and then 8-bit RAW data is converted into data in RGB format. RAW to RGB data conversion and an algorithm for color interpolation of RGB data (RGB interpolation) can be any of known ones; therefore, a description thereof is omitted.

In step S12, the YUV converter 105d converts RGB data into YUV data. YUV data is typically used in signal processing of a digital camera and suitable for JPEG compression and video signal outputs. Further, it is very usable in the signal processing since a brightness signal and a color signal (color difference signal) can be differently handled. RGB data is converted into YUV data by the following general expression (1) for example. In the expression M0 to M11 are coefficients of a matrix operation to convert RGB data to YUV data. The expression (2) is an example of values of the expression (1).

$$\begin{pmatrix} Y \\ U \\ V \end{pmatrix} = \begin{pmatrix} M_0 & M_1 & M_2 \\ M_3 & M_4 & M_5 \\ M_6 & M_7 & M_8 \end{pmatrix} \begin{pmatrix} R \\ G \\ B \end{pmatrix} + \begin{pmatrix} M_9 \\ M_{10} \\ M_{11} \end{pmatrix} \quad (1)$$

$$\begin{pmatrix} Y \\ U \\ V \end{pmatrix} = \begin{pmatrix} 0.2988 & 0.5869 & 0.1142 \\ -0.1689 & -0.3310 & 0.5000 \\ 0.5000 & -0.4179 & -0.0820 \end{pmatrix} \begin{pmatrix} R \\ G \\ B \end{pmatrix} + \begin{pmatrix} 0 \\ 128 \\ 128 \end{pmatrix} \quad (2)$$

In step S13 a color image is subjected to a monochromatic conversion. A color image can be converted into a monochrome image by setting UV components to 0 to remove colors of the color image data. The following expression (3) is a general expression to convert UV signals. In the following expression (4) coefficients M0 to M3 are set to 0 to remove color from a color image.

$$\begin{pmatrix} U_{out} \\ V_{out} \end{pmatrix} = \begin{pmatrix} M_0 & M_1 \\ M_2 & M_3 \end{pmatrix} \begin{pmatrix} U_m \\ V_m \end{pmatrix} \quad (3)$$

$$\begin{pmatrix} U_{out} \\ V_{out} \end{pmatrix} = \begin{pmatrix} 0 & 0 \\ 0 & 0 \end{pmatrix} \begin{pmatrix} U_m \\ V_m \end{pmatrix} \quad (4)$$

In step S14 the monochrome image is converted into a monotone (single color) image. Here, a monotone image is generated by adding a desirable color to the image with color removed in step S13 or the UV signals. The following expression (5) is a general expression for adding an offset value to each of the UV signals of the monochrome image. For example, a sepia-toned image will be generated by adding $U_{offset}=-6$ to a U signal and $V_{offset}=+4$ to a V signal.

$$\begin{pmatrix} U_{out} \\ V_{out} \end{pmatrix} = \begin{pmatrix} U_m \\ V_m \end{pmatrix} + \begin{pmatrix} U_{offset} \\ V_{offset} \end{pmatrix} \quad (5)$$

In step S15 color tone of an image is adjusted (color reducing process). Color adjustment including color noise reduction is an essential image processing of a digital camera. Specifically, it includes high brightness area coloring prevention to prevent a high brightness portion of an image from being colored and a low chroma compression to weaken the color of a portion with an off-balance of color in low chroma. In the present embodiment, color noise in the image is removed together with the color in the monochromatic conversion process. The tone adjustment is done for the purpose of adjusting a black tone of the monotone image having a color uniformly added irrespective of brightness in the monotone image generation process, by reducing the color of a high brightness portion of the image at a higher level than a low brightness portion of the image. In this tone adjustment process it is preferable to use a color reduction parameter which is a chroma reducing coefficient relating to a level of color reduction and set for each brightness. Examples of color reduction process will be described with reference to FIG. 4 to FIG. 6.

Figure 4:
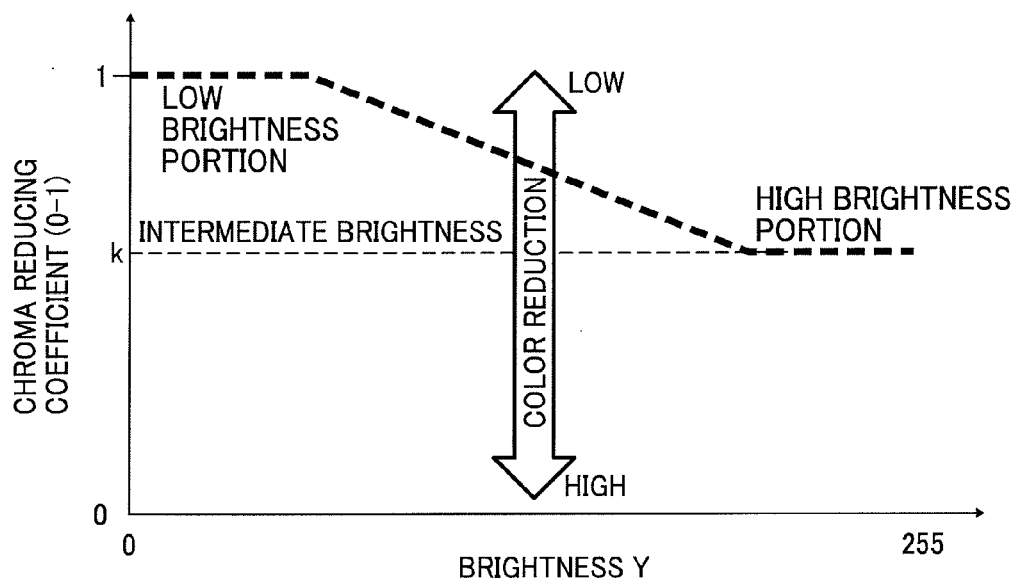
FIG. 4 shows an example of a color reduction parameter for color reduction of an image in accordance with brightness in a tone adjusting process.

FIG. 4 is a graph showing an example of a color reduction parameter for reducing the color of an image in accordance with brightness of the image. The longitudinal axis of the graph indicates brightness Y of an input image and ranges from 0 to 255 (8 bit) while the abscissa axis indicates a chroma reducing coefficient of 0 to 1. The smaller the chroma reducing coefficient, the larger the effect of the color reduction and at the chroma reducing coefficient being 1, no color reduction is carried out. Thus, to increase the level of color reduction, the chroma reducing coefficient has to be closer to 0.

In monotone image shooting, the chroma reducing coefficient as a color reduction parameter is set so that a high brightness portion of an image is subjected to color reduction at a higher level than a low brightness portion. In FIG. 4 a chroma reducing coefficient for a low brightness portion with brightness of 0 to a predetermined value is set to 0, that for a high brightness portion with brightness of a predetermined value to 255 is set to a constant value k between 0 and 1. For an intermediate brightness portion of the image between the low and high brightness portions, the chroma reducing coefficient is reduced at a certain rate between the value 1 for the low brightness portion and the value k for the high brightness portion.

According to the present embodiment, output chroma of an image is calculated by the following expression (6) using the above color reduction parameter.

$$\text{Output chroma} = ((Cb \times \text{chroma reducing coefficient}) \times (Cb \times \text{chroma reducing coefficient}) + (Cr \times \text{chroma reducing coefficient}) \times (Cr \times \text{chroma reducing coefficient}))^{1/2} \quad (6)$$

where Cb and Cr are UV signals after the YUV conversion respectively and chroma reducing coefficients are set in correspondence with brightness of a subject image in FIG. 4.

At a chroma reducing coefficient for a high brightness portion being 0.8, for example, output chroma for the high brightness portion=$((0.7*0.8)*(0.7*0.8)+(0.3*0.8)*(0.3*0.8))^{1/2} \approx 0.61$ when an input color difference (UV signals) of (Cb, Cr)=(0.7, 0.3). Meanwhile, output chroma for a low brightness portion is nearly equal to 0.76 for the same input color difference at the chroma reducing coefficient being 1. Thus, reducing chroma of a high brightness portion at a higher level than that of a low brightness portion can prevent the high brightness portion from being colored.

For representing a warm black tone or a cold black tone in a monotone image, it is necessary to remove color of the high brightness portion (in white or near white) and represent the color of photographic paper therein so that the higher the brightness, the higher the color reduction parameter to set. Meanwhile, it is necessary to keep the color of the low brightness portion so that the lower the brightness, the lower the color reduction parameter to set. By setting the color reduction parameter in such a manner, black tone representation in a monotone image as that in the silver-halide photography can be realized.

Moreover, it is preferable to adjust the characteristic of the color reduction parameter depending on a type of tone of the monotone image. For example, the color reduction parameter shown in FIG. 4 is changed to another parameter.

Figure 5:
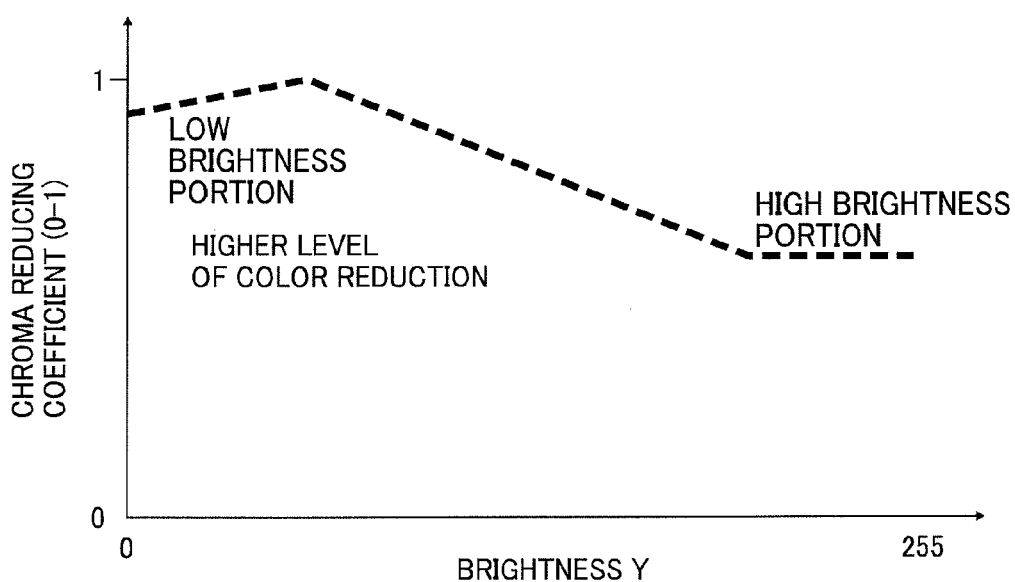
FIG. 5 shows an example of a color reduction parameter for a cold black tone image.

FIG. 5 is a graph showing an example of setting the color reduction parameter for a warm black tone image. Depending on hue of a monotone image, the image may be weakly colored or strongly colored at a low chroma. According to the Munsell color solid, for instance, at a low brightness strong black color tends to appear in a cold black tone image while weak black color tends to appear in a warm black tone image. To deal with a cold black tone image, in FIG. 5 the chroma reducing coefficient for the low brightness portion thereof is set to be smaller than 1 and the level of color reduction is more increased than that in FIG. 4. Thus, it is possible to accurately represent the black color tone in an image by setting a different color reduction parameter depending on a type of the tone.

Meanwhile, the color reduction parameter for the low brightness portion of the warm black tone image is set to be closer to one in FIG. 4 since the level of color reduction does not need to be increased as much as that for the cold black tone image.

Moreover, preferably, the image processing unit (image processing method) according to the present embodiment is configured to include a reduction degree selector (reduction degree selecting process) which is displayed to allow a user to select a degree of color reduction of a monotone image, and set the level of color reduction in accordance with the degree selected.

Users may have different tastes for the color representation of a monotone image individually. With the reduction degree selector (reduction degree selecting process), the color reduction parameter is changeable according to a result of the user's selection to decide how much the color is removed or kept, and the level of color reduction is set according to the user's taste.

Figure 6:
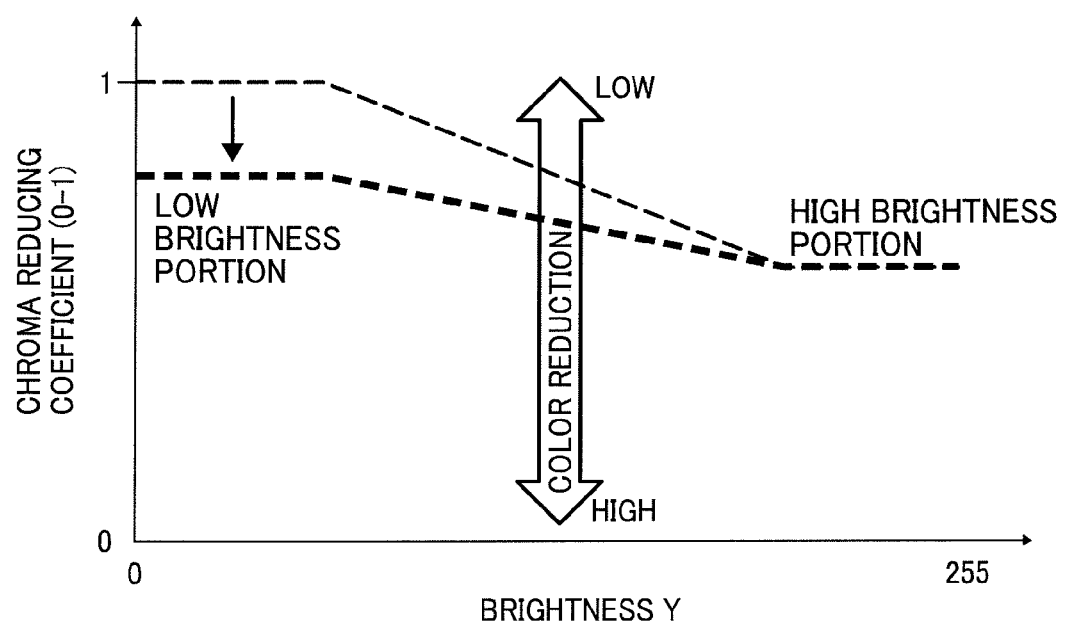
FIG. 6 shows an example of a color reduction parameter when increased in level in accordance with a degree of color reduction selected in a reduction degree selection process.

FIG. 6 is a graph showing an example of increasing the color reduction parameter in accordance with the degree of color reduction selected in the reduction degree selecting process, In this example, a user interface is provided which allows a user to determine the level of color reduction from three levels, high, medium, low. According to the selected level, the chroma reducing coefficient for the low brightness portion is changed. The color reduction parameter in FIG. 6 is one when the high degree of color reduction is selected and the chroma reducing coefficient for the low brightness portion is reduced accordingly from that in FIG. 4.

Preferably, the values of the chroma reducing coefficient are prepared in advance in the image processing unit on a manufacturer side and set in accordance with a mode selected. Also, it is preferable to display a preview image to show the color reducing effect on a screen as an LCD.

Note that in the present embodiment the CPU 105c function as a monotone image generator 105c1 and a color reducer 105c2, and the CPU 105c, the display output controller 105f, and the manipulation unit 107 function as a reduction degree selector 105c3.

As described above, the image processing unit and the image processing method according to the present embodiment is configured to adjust the tone of a monotone image generated from a digital color image by reducing the color of a high brightness portion of the image at a higher level than a low brightness portion of the image. This can advantageously prevent the high brightness portion from being colored and keep the color of the low brightness portion.

Further, the image processing unit and method according to the present embodiment can serve to solve such a problem in the tone adjustment that too strong or too weak color appears in the low brightness portion due to a difference in the tone of a monotone image, and realize accurate color representation in a monotone image.

Further, the image processing unit and method according to the present embodiment can change the level of color reduction in a black tone image (pure black tone, warm black tone, cold black tone) according to a user's taste so that it is possible to generate monotone images in quality with a user's desire reflected therein.

Further, the imaging device including the image processing unit according to the present embodiment can improve quality of monotone images.

Although the present invention has been described in terms of exemplary embodiments, it is not limited thereto. It should be appreciated that variations may be made in the embodiments described by persons skilled in the art without departing from the scope of the present invention as defined by the following claims. For example, referring to the flowchart of FIG. 3, the tone adjustment (color reduction) in step S15 can be carried out after the YUV conversion in step S12 or monochromatic conversion in step S13.

What is claimed is:

1. An image processing unit comprising:
a monotone image generator which generates a monotone image from a color image, the monotone image having a highest brightness portion and a lowest brightness portion, and no portion with a brightness that is higher or lower than in the highest and lowest brightness portions, respectively; and
a color reducer which reduces a color by reducing chroma in accordance with brightness,
wherein the color reducer adjusts a tone of the monotone image generated by the monotone image generator by reducing a color of a high brightness portion of the monotone image, by reducing a color of a low brightness portion of the monotone image, and by reducing a color of the high brightness portion of the monotone image at a higher level than the low brightness portion of the monotone image in response to a same input color difference, such that the level of the color reduction is higher in the high brightness portion of the monotone image than in the low brightness portion of the monotone image,
the high brightness portion of the monotone image includes the highest brightness portion, and the low brightness portion includes the lowest brightness portion,
the reducing of the color of the low brightness portion includes decreasing the level of color reduction as brightness increases from the lowest brightness portion, such that the level of color reduction is higher in the lowest brightness portion than in another portion of the low brightness portion, and
the reducing of the color of the high brightness portion includes increasing the level of color reduction as brightness increases, and wherein the level of color reduction in the highest brightness portion is higher than in the lowest brightness portion.

2. An image processing unit according to claim 1, wherein the color reducer adjusts the tone of the monotone image using a color reduction parameter which is a chroma reducing coefficient relating to a level of color reduction and set for each brightness.

3. An image processing unit according to claim 2, wherein the color reducer adjusts a characteristic of the color reduction parameter in accordance with a type of the tone of the monotone image.

4. An image processing unit according to claim 1, further comprising a reduction degree selector which is displayed to be able to select a degree of color reduction in the monotone image, wherein the color reducer sets a level of the color reduction in accordance with the degree of color reduction selected with the reduction degree selector.

5. An image processing method comprising the steps of:
generating a monotone image from a color image, the monotone image having a highest brightness portion and a lowest brightness portion, and no portion with a brightness that is higher or lower than in the highest and lowest brightness portions, respectively;
reducing a color by reducing chroma in accordance with brightness; and
adjusting a tone of the monotone image by reducing a color of a high brightness portion of the monotone image, by reducing a color of a low brightness portion of the monotone image, and by reducing a color of the high brightness portion of the monotone image at a higher level than the low brightness portion of the monotone image in response to a same input color difference, such that the level of the color reduction is higher in the high brightness portion of the monotone image than in the low brightness portion of the monotone image,
wherein the high brightness portion of the monotone image includes the highest brightness portion, and the low brightness portion includes the lowest brightness portion,
the reducing of the color of the low brightness portion includes decreasing the level of color reduction as brightness increases from the lowest brightness portion, such that the level of color reduction is higher in the lowest brightness portion than in another portion of the low brightness portion, and
the reducing of the color of the high brightness portion includes increasing the level of color reduction as brightness increases, and wherein the level of color reduction in the highest brightness portion is higher than in the lowest brightness portion.

6. An image processing method according to claim 5, wherein the tone of the monotone image is adjusted using a color reduction parameter which is a chroma reducing coefficient relating to a level of color reduction and set for each brightness.

7. An image processing method according to claim 6, wherein a characteristic of the color reduction parameter is adjusted in accordance with a type of the tone of the monotone image.

8. An image processing method according to claim 5, further comprising the step of displaying a degree of color reduction of the monotone image for selection, wherein a level of color reduction is set in accordance with a degree of color reduction selected in the reduction degree displaying step.

9. An imaging device comprising:
an image processing unit which comprises:
a monotone image generator which generates a monotone image from a color image, the monotone image having a highest brightness portion and a lowest brightness portion, and no portion with a brightness that is higher or lower than in the highest and lowest brightness portions, respectively; and
a color reducer which reduces a color by reducing chroma in accordance with brightness,
wherein the color reducer adjusts a tone of the monotone image generated by the monotone image generator by reducing a color of a high brightness portion of the monotone image, by reducing a color of a low brightness portion of the monotone image, and by reducing a color of the high brightness portion of the monotone image at a higher level than the low brightness portion of the monotone image in response to a same input color difference, such that the level of the color reduction is higher in the high brightness portion of the monotone image than in the low brightness portion of the monotone image,
the high brightness portion of the monotone image includes the highest brightness portion, and the low brightness portion includes the lowest brightness portion,
the reducing of the color of the low brightness portion includes decreasing the level of color reduction as brightness increases from the lowest brightness portion, such that the level of color reduction is higher in the lowest brightness portion than in another portion of the low brightness portion, and the reducing of the color of the high brightness portion includes increasing the level of color reduction as brightness increases, and wherein the level of color reduction in the highest brightness portion is higher than in the lowest brightness portion.

\* \* \* \* \*